(No Model.)
A. H. PARKS.
Lifting Jack.
No. 240,330.   Patented April 19, 1881.
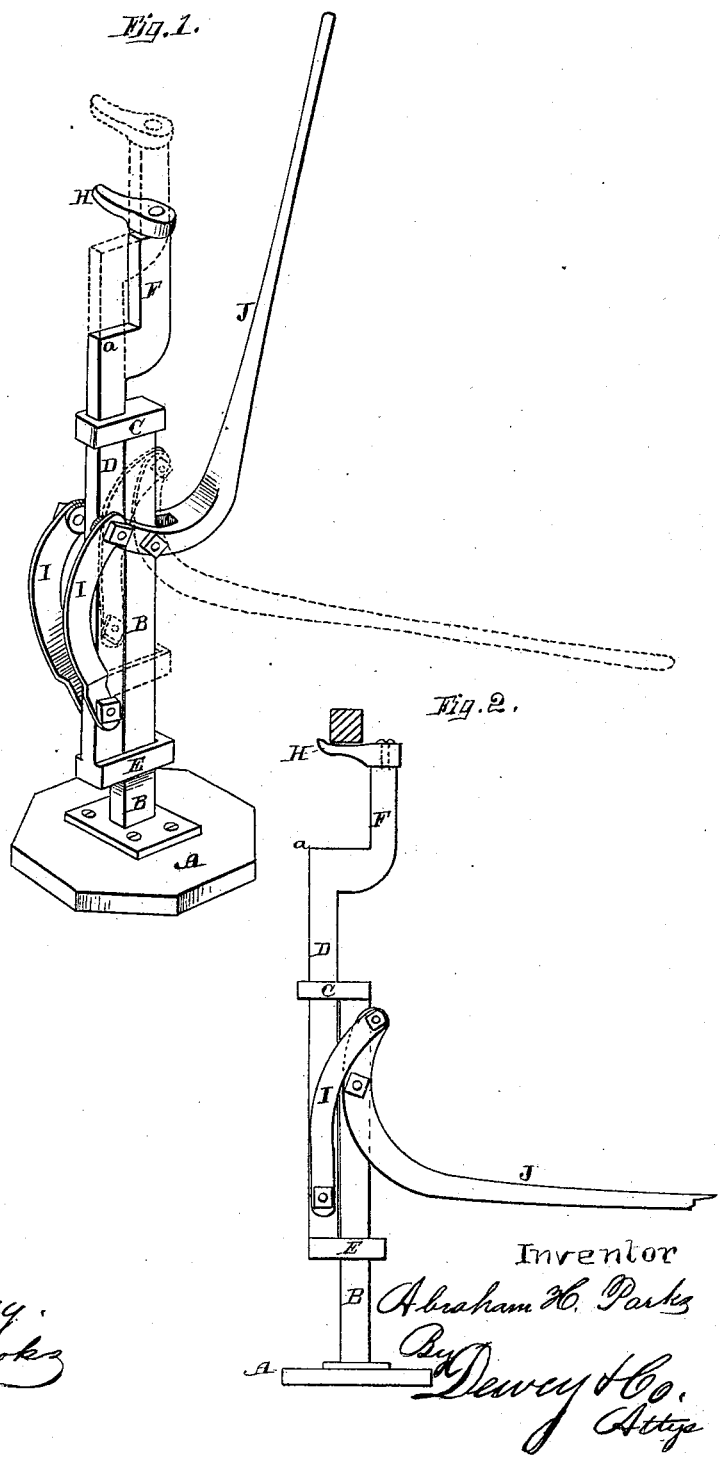
Witnesses
Geo. H. Strong
Frank A. Brooks
Inventor
Abraham H. Parks
By Dewey & Co.
Attys

UNITED STATES PATENT OFFICE.

ABRAHAM H. PARKS, OF BLOOMFIELD, CALIFORNIA.

LIFTING-JACK.

SPECIFICATION forming part of Letters Patent No. 240,330, dated April 19, 1881.

Application filed September 1, 1880. (No model.)

*To all whom it may concern:*

Be it known that I, ABRAHAM H. PARKS, of Bloomfield, county of Sonoma, and State of California, have invented an Improved Lifting-Jack; and I hereby declare the following to be a full, clear, and exact description thereof.

My invention relates to certain improvements in lifting or wagon jacks; and it consists in a novel combination of a stationary standard and a vertically-moving lifting-bar, which is connected with the standard by slotted guiding-plates, and is caused to move up or down by means of a curved lever connected with it by curved links, and so pivoted to the stationary standard that when the weight has been lifted the curved links and lever will form a lock to retain it in place without other fastening. In combination with this device, I employ a stationary and a movable lifting-shoulder to fit axles of different heights, as will be more fully explained by reference to the accompanying drawings, in which—

Figure 1 shows my jack with the moving bar depressed and the weight on the fixed lifting-shoulder. Fig. 2 shows it elevated with weight supported upon the movable lifting-shoulder.

A is a base, suitably formed, and having the standard B secured to it. This standard is made preferably of flat bar-iron, and it has a slotted guiding plate or loop, C, secured to its upper end and projecting to one side, so as to just admit the movable lifting-bar D to slide within and be guided by the slot. The lower end of the bar D has a similar guide, E, secured to it and fitted to slide upon the standard B, so that the two guides cause the lifting-bar to move easily and in a vertical line. The upper end of the bar D has an offset, so as to form a shoulder, *a*, upon which the forward axle of a wagon may be lifted and be supported directly in line with the bar and the lifting-power which is applied to it. The bar extends upward at the side of this shoulder, as shown at F, and has the movable transverse lug or bar H strongly pivoted to its top, so it may be turned in a horizontal plane. This movable shoulder or lug is turned to one side and out of the way when the forward axle is to be raised, as in Fig. 1; but when the rear axle is to be elevated it is turned so as to stand in line above the bar D, as in Fig. 2, thus giving me a simple adjustment for different heights.

In order to raise the bar D, I employ one or two curved links, I, which are pinned to the bar D near its lower end. These links form an arc, curving around so that their upper ends are connected with the end of the curved lever J. This lever is pivoted to the standard B, and has a straight handle extending outward from the fulcrum, while the portion forming the short arm of the lever curves upward, as shown, and its end unites with the ends of the links, so that when the outer end of the lever is depressed the curved inner end is thrown up and back of the fulcrum-pin. The upper ends of the curved links are also drawn back of this pin, so that when the bar D has been raised with its load the whole weight will be supported in a line behind the fulcrum, and no lock or latch will be needed to hold the lever with its weight.

Having thus described my invention, what I claim as new, and desire to secure by Letters Patent, is—

The vertical standard B, sliding lifting-bar D, provided with the shoulder *a*, and guiding loops or plates C E, in combination with the convex-curved link I, lever J, having that portion forming the short arm curved, swiveling bar H, and extension F, all constructed and operated substantially as and for the purpose herein described.

In witness whereof I have hereunto set my hand.

ABRAHAM H. PARKS.

Witnesses:
GEO. H. STRONG,
FRANK A. BROOKS.